United States Patent Office 3,119,919
Patented Jan. 28, 1964

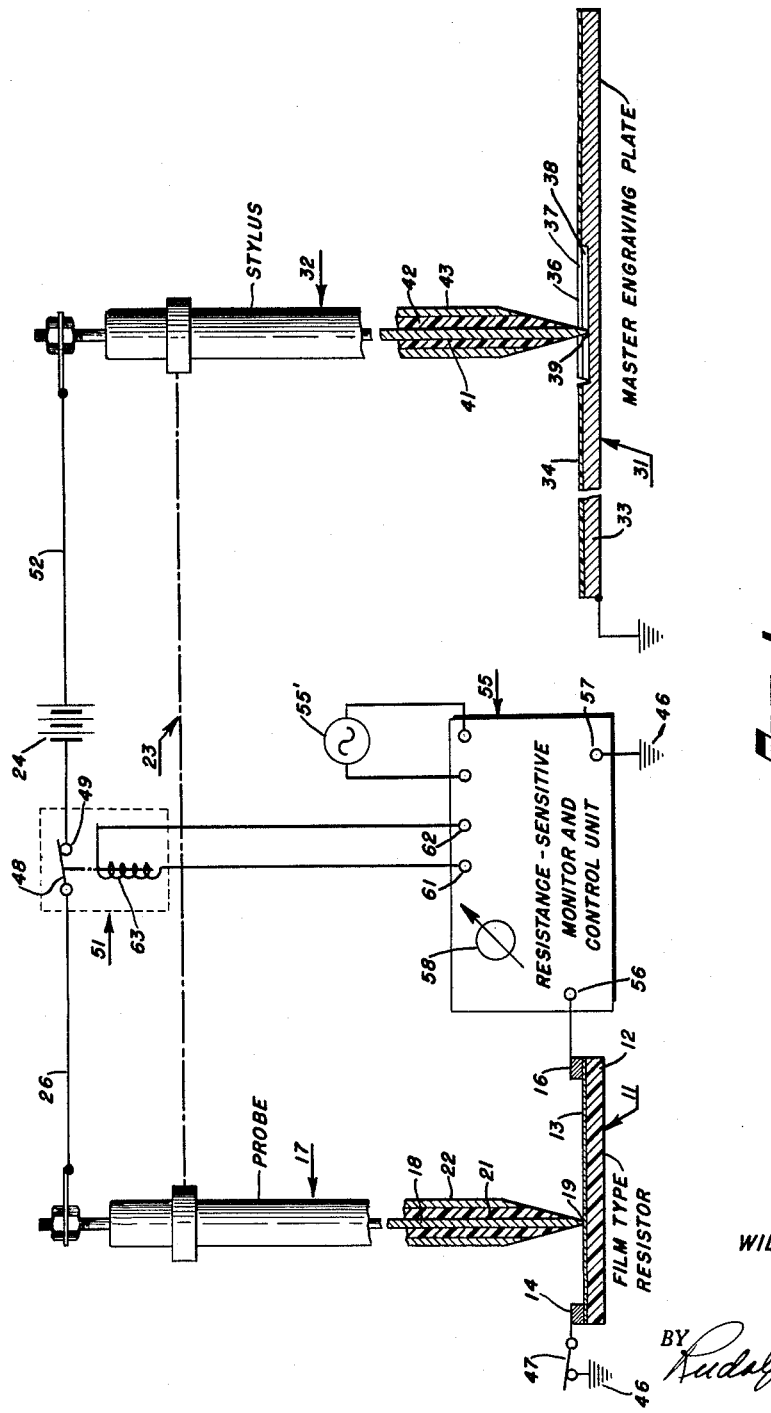

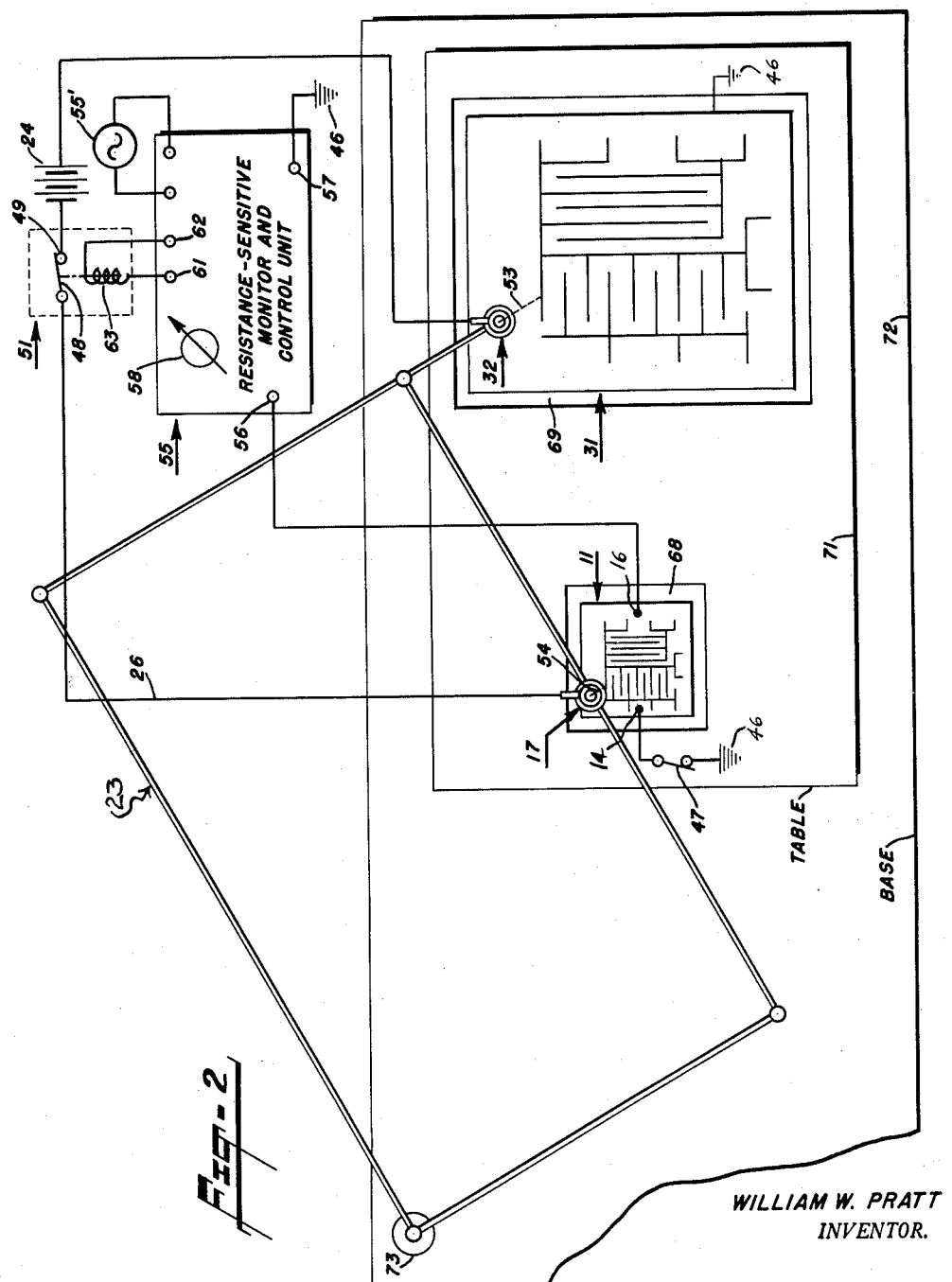

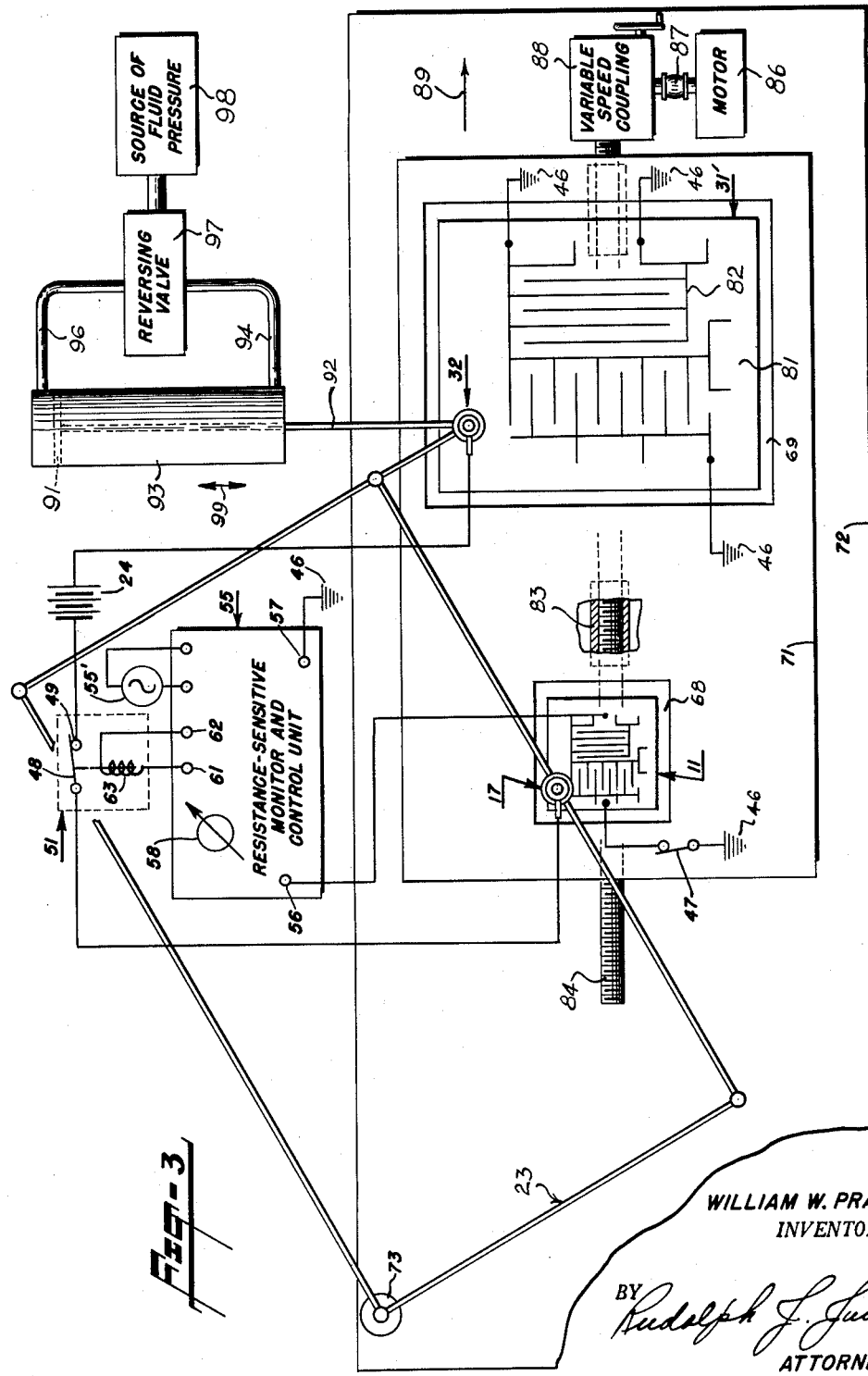

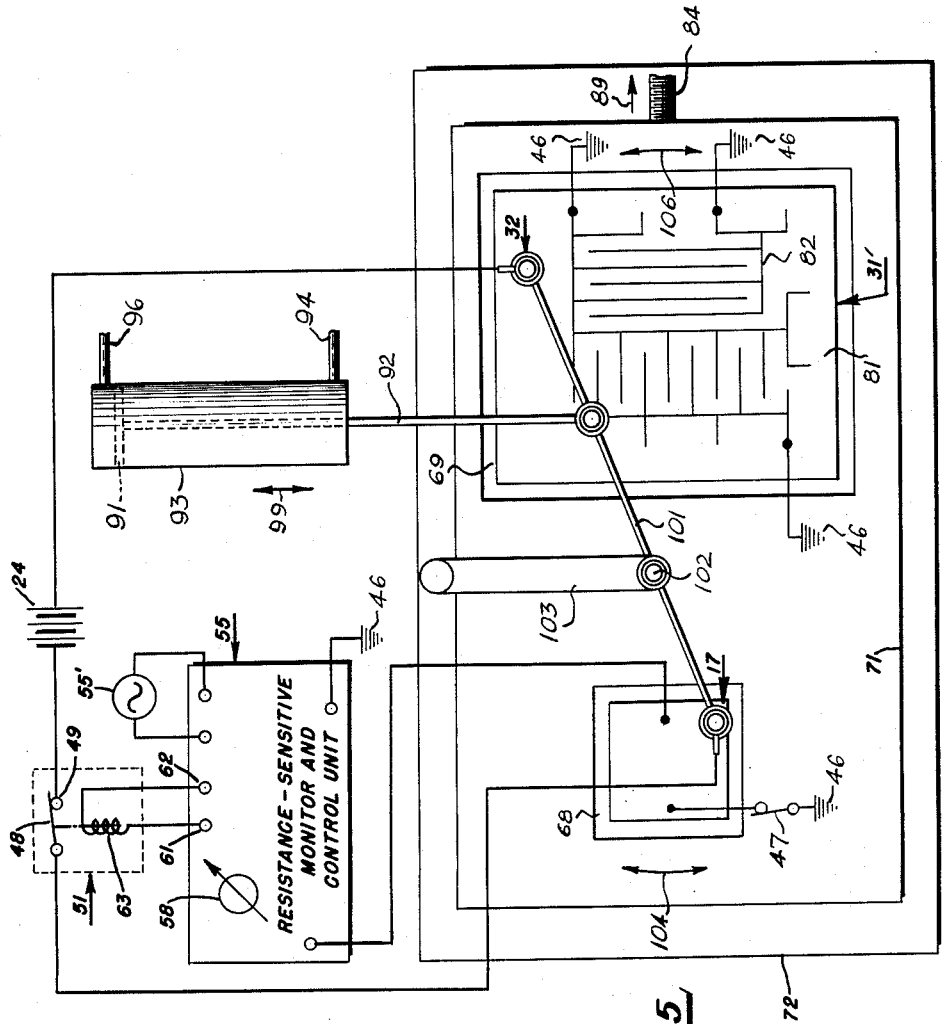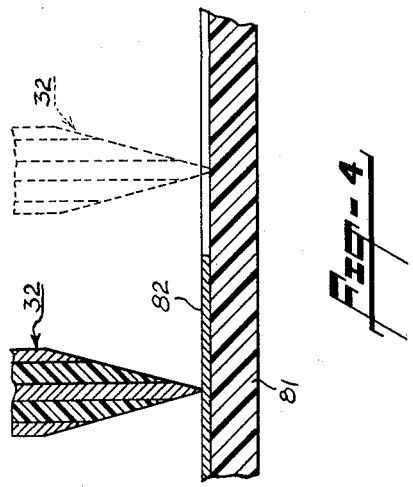

3,119,919
APPARATUS FOR THE REMOVAL OF PORTIONS OF DEPOSITED METAL FILMS
William W. Pratt, Middletown, N.J., assignor to Daystrom Incorporated, Murray Hill, N.J., a corporation of Texas
Filed Jan. 30, 1961, Ser. No. 85,784
7 Claims. (Cl. 219—19)

This invention relates to a method and apparatus for the removal of metal film from an insulating base or substratum, and more particularly to a novel master engraving plate and stylus, and to an electrical control circuit arrangement for use in the apparatus which includes said plate and stylus.

The apparatus of this invention is of particular value for use in tracing out a labyrinthine pattern on the surface of a deposited film type resistor to adjust the resistance of such resistor to a desired value. As will become apparent, the apparatus is not limited to such use, but may be used in the removal of a deposited metal film from an insulating surface for any desired purpose. For purposes of description, however, the apparatus will be described for use in adjustment of metallic film resistors to desired value.

The novel apparatus is adapted for use in conjunction with a copying machine, such as a pantograph, or the like, which mechanically links a stylus with a probe. In one embodiment of the apparatus, the stylus is adapted for movement along a predetermined pattern comprising a labyrinth of grooves formed in a master engraving plate, which pattern of movement is transferred through the pantograph, or the like, to the probe. The probe is provided with a pointed end which rides on the metallic film resistor. The resistance film is connected to one terminal of a low voltage D.-C. source of supply while the probe, which includes a conducting tip, is connected to the other terminal thereof. The passage of current through the sharp pointed probe produces sufficient heat at the metallic film to melt the metallic film and thereby produce a clean uniform adjustment cut thereon. The probe pressure on the film is very light; only enough pressure to make electrical contact therebetween being required. With this embodiment of the invention a novel conducting stylus and master engraving plate are employed through which the electrical circuit from the D.-C. source to the probe and metallic film resistor is made. When the stylus is out of electrical contact with the master engraving plate, no current flows through the probe and film type resistor and, as a result, no pattern is electrically cut in such metallic film. Further, a film of insulation is provided on the conducting master engraving plate through which film grooves are formed within which grooves the stylus rides. If the stylus is inadvertently pushed out of the groove, the stylus will ride up onto the insulating material thereby breaking the electrical circuit to the cutting probe. Damage to the film resistor by such accidental or inadvertent movement of the stylus is thus prevented.

In another embodiment of this invention, the above-described stylus of the copying machine is made to scan a master plate which comprises an insulating base upon which a conducting film is deposited in the desired labyrinthine pattern. When the stylus rides on the insulating base, no current flows through the probe and, as a result, no pattern is electrically cut in the metallic film of the work piece. As the stylus crosses the conducting film on the master, the electrical circuit is completed and a "cut" is produced in the metallic film of the work piece. Such an arrangement is obviously well adapted for mass production use.

An object of this invention is the provision of an electrical means for the removal of portions of deposited metal films from an insulating base in which all chances of error in the cutting of the desired pattern are eliminated.

An object of this invention is the provision of a copying machine of the type which includes a probe which is adapted to be moved across a metallic film for cutting a pattern in the film upon application of a potential source between the probe and metal film, the improvement comprising connecting the potential source through a stylus and master plate in a manner whereby the electrical circuit conduction to the probe is disrupted when the stylus is removed or displaced from the pattern formed on the master plate.

An object of this invention is the provision of a master plate for use in a copying machine which plate is made of conducting material with an insulating cover thereon, and means forming a groove in the insulating cover through which a conducting stylus is adapted to extend to contact the said plate.

An object of this invention is the provision of a master plate for use in a copying machine which plate is made of an insulating base with a film of conducting material thereon in the form of a desired pattern over which plate a conducting stylus may be scanned.

These and other objects and advantages of this invention will become apparent from the following description when taken with the accompanying drawings, which drawings are for purposes of illustration and are not to be construed as defining the scope or limits of the invention, reference being had for the latter purpose to the appended claims.

In the drawings wherein like reference characters denote like parts in the several views;

FIGURE 1 is an elevational view, with parts in section and parts diagrammatically shown, of a copying machine embodying my invention;

FIGURE 2 is a top plane view of the arrangement shown in FIGURE 1, only showing the copying machine as a pantograph and showing the stylus removed from the groove in the master plate;

FIGURE 3 is a top plane view of a copying machine for automatic scanning of a master plate;

FIGURE 4 is an enlarged fragmentary sectional view of the master plate shown in FIGURE 3; and FIGURE 5 is a diagrammatic view of a modified partial embodiment of an automatic scanning arrangement for a copying machine.

Referring to FIGURES 1 and 2 of the drawings, reference numeral 11 designates a wafer resistor of the deposited metallic film type which resistor comprises a base or substratum of insulating material 12 and a metal film 13 deposited thereon. The resistor may be provided with a pair of terminals 14 and 16 for electrical connection to the metal film. Included is an electrical "cutting" probe 17 which comprises a probe element 18, pointed as at 19, an insulating sleeve 21 and an outer tubular shell 22 of suitable diameter to operate in a copying machine 23, merely shown as a broken line in FIGURE 1 and as a pantograph in FIGURE 2. A very light probe pressure is maintained between the point 19 and the film 13 for electrical contact therebetween, which pressure is insufficient to damage the film as the probe is moved thereacross with no potential applied thereto. The metallic film is removed from the resistor by application of a relatively small D.-C. potential across the probe and metallic film junction, which potential may be supplied by a source of supply 24. The cathode terminal of the supply potential source 24 is shown connected to the probe element 18 through a lead wire 26, while the anode terminal of the source 24 is connected through the stylus element 41 and the common ground 46 described hereinbelow to the metallic film 13. When the electrical circuit from the anode to the metallic film is completed, the probe can be moved across the film to produce a clean uniform adjustment cut in the film with a single pass. In one working arrangement, a cut having a width on the order of .003″ is formed.

In the embodiment of the invention shown in FIGURES 1 and 2, the probe 17 is adapted for manual movement, with the pattern of the motion of the probe across the film of the resistor being under control of a master engraving plate, designated 31, and a stylus 32 which is moved along a grooved pattern formed in the plate, which stylus is mechanically connected through the copying machine mechanism 23 to the probe 17. As shown diagrammatically in FIGURE 2, the resistor 11 and engraving plate 31 are held in suitable holders 68 and 69 suitably secured to a table 71, which table may be movable both transversely and longitudinally in conventional cross slides on the base 72 of the copying machine, which machine may be of conventional, well known construction, with a pantograph pivotally supported in an upright column 73 extending from the base 72.

The master engraving plate comprises a flat plate 33 of conducting material over which a layer of insulating material 34 is permanently bonded or secured by any suitable means. A groove, or grooves 36 are formed through the insulation and into the plate 33 (as at 37 and 38, respectively, in FIGURE 1) within which the pointed end 39 of a stylus element 41 of conducting material may extend for electrical connection between the stylus element and plate. Like the probe, the stylus 32 may include an insulating sleeve 42 surrounding the element 41, and an outer tubular housing, or shell, 43 of suitable diameter to operate in the copying machine. The plate 33 and stylus element 41 may be of hardened conducting material for long operating life thereof. The grooves 36 in the master plate may form any desired labyrinthine pattern for adjustment of the resistor 11 to the desired resistance value (or for the creation of a specific circuitry on a metallic film deposited on an insulating base).

The complete electrical circuit from the battery, or supply source 24, may now be traced. The one terminal 14 of the metallic film 13 is shown connected to a common ground connection 46 (which may comprise the metallic frame or base 72 of the copying machine, if desired) through an on-off switch 47, shown in the closed position. The cathode terminal of the D.-C. supply 24 is connected through contacts 48 and 49 of a relay 51 and the lead wire 26 to the probe element 18 of the probe 17, while the anode is connected to the stylus element 41 of the stylus 32. The metal base plate 33 of the master engraving plate 31 is also connected to the common ground 46 thereby completing the potential source circuit. With the contacts of the switch 47 and the relay 51 closed, the metallic film adjacent the pointed probe element 18 will be "cut" away by the action of the current flow between the probe and film, and the motion of the probe across the film by connection to the stylus 32 results in the production of a similar pattern as is on the master engraving plate; the stylus element 41 being moved along the groove 36 therein either manually or mechanically. If, during operation, the stylus element 41 is removed from the groove 36 or inadvertently slips therefrom and onto the insulating film 34, the electrical circuit from the anode of the supply source to the metallic film is broken and the cutting action stops. There is, therefore, no resulting damage to the metal film such as would occur in many prior art "engraving" devices if the stylus slipped from the groove in the master plate. My invention not only eliminates operator error in arrangements wherein the stylus 32 is manually moved, but also simplifies the automation of such arrangements. As seen in FIGURE 2, if the stylus 32 slips out of the groove 36 and along the path of the broken line 53, the corresponding movement of the probe 17 over the resistor 11, as at 54, does not result in cutting action of the metallic film since the power supply is removed from the probe immediately upon movement of the stylus from the groove.

The resistance of the resistor 11 may be readily monitored during the adjustment procedure and the engraving power shut off automatically when the desired resistance value is reached. To these ends, there may be included a resistance sensitive monitor and control unit 55 having one input terminal 56 connected to the terminal 16 of the resistance, and the other input terminal 57 connected to the common ground connection 46. A meter 58 may be included in the device for the direct indication of the resistance of the resistor 11. Output terminals 61 and 62 may be connected to the control winding 63 of the relay 51, which relay is energized to open the contacts 48 and 49 when the desired resistance value is reached. The monitor and control unit 55 may be of conventional design comprising an A.-C. impedance bridge energized by an A.-C. source of supply 55′.

It will be apparent that by the use of a pantograph, any convenient ratio of size between the pattern on the master plate and resistor may be employed. Further, the system is applicable to use in a multiple pantograph in which any reasonable number of electrical probes 17 are employed to simultaneously trace a desired pattern over a like number of work pieces, or resistors, in response to the guidance of a single stylus and master plate. In such an arrangement, individual resistance control units 55 are required for each resistor, or work piece. Further, it will be apparent that the stylus and engraving plate may be connected through relay control means to the probe circuit rather than directly therewith, as illustrated.

Reference is now made to FIGURES 3 and 4 of the drawings wherein there is shown a modified form of the invention shown in FIGURES 1 and 2. In the embodiment of the invention shown in FIGURES 3 and 4, the stylus 32 is made to scan a master plate designated 31′, which plate, as best seen in FIGURE 4, comprises a base 81 of insulating material having thereon a ribbon or ribbons of thin conducting film 82 forming any desired labyrinthine pattern. In FIGURE 4, the metallic film dimension has been greatly exaggerated for purposes of illustration. It will be understood, however, that the top surface of the metallic film 83 is only slightly raised over the top surface of insulating base 81 and for all practical purposes the surfaces are substantially flush. For this reason, the stylus is free to slide over the plate 31′ freely; the stylus being shown on the metallic film 82 in the full line showing thereof and on the insulating base 81 in the broken line showing thereof in FIGURE 4.

In the embodiment of the invention shown in FIGURES 3 and 4, the stylus 32 is made to scan the master plate 31′. Obviously, scanning can be effected by the movement of the stylus over the plate, the movement of the plate under the stylus, or a combination of movements of the stylus and plate. That is, scanning is effected by the relative movement of the stylus and plate. In the illustrated arrangement, the table 71, upon which the work piece 11 and master plate 31′ are mounted, is moved in one direction while the stylus is reciprocated in a substantially perpendicular direction with respect to the table movement. Threaded nuts 83 are secured to the bottom of the plate 71 by means not shown, through which nuts a lead screw 84 extends. The screw 84 is driven by a motor 86 connected thereto through a coupling device 87 and variable speed coupling arrangement 88. In the illustrated arrangement, the table is moved in the direction of an arrow 89 upon energization of the motor 86 by means not shown. Movement of the stylus 32 across the plate 31′ may be effected by means of a reciprocating piston 91 connected through a connecting arm 92 to the stylus. The piston reciprocates in a cylinder 93 connected through lines 94 and 96, and a reversing valve 97, to a source of fluid pressure 98. The cylinder 93 is mounted on the base 72 of the machine by any suitable means not shown. As will be understood by those skilled in the art, the piston reciprocates in the cylinder 93 and thereby drives the stylus back and forth across the master plate 31', in the direction of the double headed arrow 99. As mentioned above, about a .003" cut is made by the probe 17 in the metallic film. The rate of feed of the table and reciprocation of the piston 91 are adjusted to provide a movement of the probe 17 along paths which are spaced about .0015" whereby a continuous surface of the work piece 11 is subjected to the cutting action upon application of a potential between the probe and film on the piece 11.

The metallic film 82 on the master plate 31' is connected to the common ground 46 whereby the electrical circuit to the probe element 18 of the probe 17 is completed when the stylus element 41 of the stylus 32 contacts the film 82 during the scanning action. The labyrinthine pattern on the master plate 31' is substantially duplicated by the cutting action of the probe 17 on the element 11. The electrical circuitry for the probe may include the same resistance sensitive monitor and control unit 55, described above, for automatically opening the D.-C. circuit to the probe upon reaching the desired resistance value.

The mechanism connecting the stylus 32 with the probe 17 is not limited to a pantograph, as illustrated in FIGURES 3 and 4. An alternative connecting means is shown in FIGURE 5, which includes a lever arm 101 pivotally supported about a pin 102 carried by an arm 103 suitably secured to the base 72. The arm is pivoted about the axis of the pin, with the probe 17 and stylus 32 moving in the directions of the double headed arrows 104 and 106, respectively. The table 71 bearing the work piece 11 and master plate 31' is moved along the axis of the lead screw in the direction of the arrow 89, as in the mechanism shown in FIGURES 3 and 4. It will be apparent that the pattern of the metallic film 82 on the master plate 31' will appear inverted on the work piece 11. The exact duplication of the pattern is not essential in the production of resistors, and the inversion of the pattern does not deter from the quality of resistor capable of being produced by this method.

Having now described this invention in detail, in accordance with the requirements of the patent statutes, various other changes and modifications will suggest themselves to those skilled in this art, and it is intended that such changes and modifications may be made without departing from the spirit and scope of the invention as defined in the following claims.

I claim:

1. In an electrical engraving copying system of the type which includes a probe of conducting material adapted for movement over the film of an electrically conductive film-type resistor for removal of the film upon passage of an electrical current through the probe, the movement of the probe corresponding to the movement of a stylus mechanically coupled thereto which stylus is adapted for movement along a groove in a master engraving plate; the improvement comprising a master engraving plate of conducting material and having an insulating film thereover, means forming a groove through the insulating film into the plate, a stylus of conducting material adapted to electrically contact the plate within the groove therein, and a source of potential connected between the probe and the film of the resistor through the said conducting stylus and plate.

2. In an electrical engraving system for the removal of a metallic film from a base of insulating material, a master engraving plate of conducting material having a groove formed therein, a stylus of conducting material movable along the groove in the plate, a probe of conducting material mechanically connected to the stylus and movable across the metallic film with a pattern corresponding to the pattern provided by movement of the stylus on the plate, a source of engraving power, and means connecting the said source through the stylus and plate to the said probe and metallic film.

3. The invention as recited in claim 2 including an insulating film over the plate, and means forming a groove in the insulating film cooperating with the groove in the plate through which groove the stylus may extend to contact the said plate.

4. In an electrical engraving system for the removal of an electrically conductive film from a base of insulating material, a master plate of insulating material, an electrically conductive guide pattern secured to the plate, a stylus of conducting material contacting the plate, a probe of conducting material mechanically connected to the stylus, means moving the stylus relative to the master plate with a scanning motion thereby imparting similar motion to the probe, a source of engraving power, and means connecting the source across the said probe and the film through the said stylus and the pattern of the master plate.

5. Apparatus for removing an electrically conductive film from a base member of an electrically nonconductive material, said apparatus comprising:
 a master guide member of an electrically conductive material having a guide pattern formed therein,
 a stylus of an electrically conductive material movable along said pattern,
 a probe of an electrically conductive material mechanically connected to said stylus and movable across said film in a pattern corresponding to said guide pattern,
 a source of electrical potential,
 and means completing an electrical circuit across said source through said stylus, said guide member, said film, and said probe, wereby a pattern corresponding to said guide pattern may be electrically cut in said film.

6. The invention as recited in claim 5 including:
 an insulating film over said guide member,
 and means forming a groove in the insulating film cooperating with said guide pattern through which groove the stylus may extend to electrically contact said guide member.

7. The invention recited in claim 5 wherein said pattern comprises:
 a groove formed in said guide member.

References Cited in the file of this patent
UNITED STATES PATENTS

| | | |
|---|---|---|
| 656,940 | Chevalier | Aug. 28, 1900 |
| 1,493,014 | Boyle | May 6, 1924 |
| 1,651,071 | Steffens | Nov. 29, 1927 |
| 1,695,617 | Teissere et al. | Dec. 18, 1928 |
| 2,173,741 | Wise et al. | Sept. 19, 1939 |
| 2,248,057 | Bond | July 8, 1941 |
| 2,251,742 | Kline | Aug. 5, 1941 |
| 2,268,654 | Goddu et al. | Jan. 6, 1942 |
| 2,380,357 | Ziebolz | July 10, 1945 |
| 2,492,214 | Fonda | Dec. 27, 1949 |
| 2,680,184 | Cox | June 1, 1954 |
| 2,854,560 | Hill | Sept. 30, 1958 |
| 2,925,464 | Raible | Feb. 16, 1960 |